UNITED STATES PATENT OFFICE.

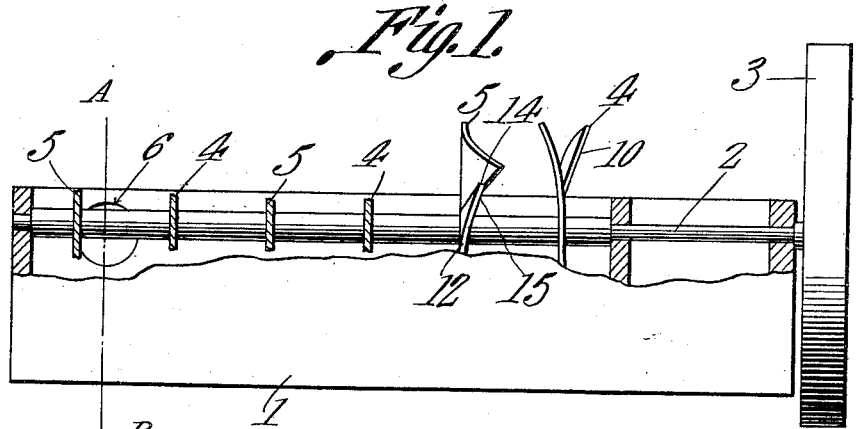

FERD CLEMENS, OF WHAT CHEER, IOWA.

CEMENT-MIXER.

994,978.

Specification of Letters Patent. Patented June 13, 1911.

Application filed August 1, 1910. Serial No. 574,917.

*To all whom it may concern:*

Be it known that I, FERD CLEMENS, a citizen of the United States, residing at What Cheer, in the county of Keokuk and State of Iowa, have invented a new and useful Cement-Mixer, of which the following is a specification.

It is the object of the present invention to provide a mixer for cement, and other plastic materials, provided with agitating elements of novel and improved form, and so to assemble them with respect to each other that a maximum efficiency may be attained.

In the drawings, Figure 1 is a side elevation, parts being broken away; Fig. 2 is a fragmental top plan; Fig. 3 is a top plan showing two of the agitating elements of the device, these agitating elements being rotated slightly from the positions in which they are shown in Fig. 2; and Fig. 4 is a transverse section upon the line A—B of Fig. 1.

In carrying out the invention there is provided a trough 1, in which a shaft 2 is supported for rotation, the shaft 2 being provided at one end with a wheel 3 or the like, whereby the shaft may be rotated. Secured to the shaft 2, within the contour of the trough 1, are a plurality of blades 4 and 5. These blades 4 and 5 are of different constructions, and are preferably alternated, from one end of the trough to the other. There may be any number of the blades 4 and 5 their number being dictated solely by the length of the shaft 2. The trough 1 is provided with an outlet 6 for the plastic material, this outlet 6 being positioned in any desired manner, as may best suit the work in hand. The blades 4 and 5 may be fastened in any desired manner.

By referring to Fig. 4, it will be seen that a single sheet of metal 16, is radially cleft to form the blades, three blades being shown, although a greater or less number may be employed without jeopardizing the utility of the invention. It is to be noted that the blades 4 are reversely curved, transversely of their axis of rotation, as denoted by the numeral 7. The blades 5 are, however, concaved as shown at 8, to present a concaved face toward the reversely curved blades 4. In the case of the blades 4, one of the lateral edges of each blade is extended toward the blades 5, as shown at 9, the other lateral edge of each of the blades 4 being extended in an opposite direction, as shown at 10. In concaving the blades 5, these blades are not concaved in a regular curve, but adjacent one of their lateral edges 15, the said blades are curved gradually as shown at 12. Adjacent their other lateral edge 14, the blades 5 are curved somewhat sharply as shown at 11. By referring particularly to Figs. 2 and 3, it will be seen that the lateral edges 14 and 15 of the blades 5 are disposed out of alinement with each other, the edge 14 being disposed somewhat nearer to the blades 4 than is the edge 15. By referring to Fig. 2 it will be seen that the edge 9 of the blades 4 is disposed opposite to the intermediate portion of one of the concaved blades 5.

Let it be supposed that the shaft 2 is rotating in the direction of arrow A in Fig. 2. The operation of the device, in such case, is as follows. The plastic material within the trough 1 will travel, as indicated by the arrow B, along the forward edge of one of the blades 4, the material being deflected, as shown by the arrow C, from the said reversely curved blade 4, toward the intermediate portion of one of the concaved blades 5. The plastic material, following the arrow D, will move along the concaved blade 5, and, by reason of the fact that the edges 14 and 15 of the blades 5 are not in alinement, will pass, as indicated by the arrow E, through the opening between one of the blades 5 and the next adjacent blade to be engaged by the forward face of said adjacent blade; the operation above described being appreciated most clearly when Fig. 2 of the drawings is examined. It will be seen that the blades 4 and 5 coöperate, generally speaking, to advance the plastic material from one end of the trough 1 to the other. However, owing to the fact that the blades 4 are reversely curved, while the blades 5 are concaved, the plastic material, although advanced, generally, in a given direction, will, at the same time, and during its general advancement, be worked to and fro in a line at right angles to the planes of rotation of the blades 4 and 5. By this construction, the plastic material in the trough 1 will be thoroughly agitated during its progress from one end of the trough to the other.

Having described the invention, what is claimed is:

A mixer comprising rotatable members fixed with respect to each other, one of said members comprising a plurality of reversely curved blades, the other of said members consisting of a plurality of concaved blades, the concaved faces of which are disposed toward the reversely curved blades, the adjacent lateral edges of the concaved blades being disposed out of alinement, one of the lateral edges of the reversely curved blade being disposed opposite the intermediate portion of a concaved blade.

In testimony that I claim the foregoing as my own, I have hereto affixed my signature in the presence of two witnesses.

FERD CLEMENS.

Witnesses:
DWIGHT CLEMENS,
W. J. GARRETT.